United States Patent Office 3,124,423
Patented Mar. 10, 1964

3,124,423
METHOD OF PURIFYING ELEMENTAL PHOSPHORUS FOR SEMICONDUCTOR USES
Hans Merkel and Siegfried Leibenzeder, Erlangen, Germany, assignors to Siemens-Schuckertwerke Aktiengesellschaft, Berlin-Siemensstadt and Erlangen, Germany, a corporation of Germany
Filed Oct. 30, 1962, Ser. No. 234,168
Claims priority, application Germany Nov. 2, 1961
8 Claims. (Cl. 23—223)

Our invention relates to a method of purifying phosphorus, particularly to the extreme degree of purity desirable for use in electronic semiconductor materials. Highly purified phosphorus is required, for example, in the production of semiconductor compounds such as GaP, InP, AlP, BP, InAsP, GaAsP, as well as for use as a dopant for semiconductor materials such as silicon or germanium, and for transport reactions and epitaxial processes as employed for growing and doping semiconductor crystals and the production of p-n junctions therein. For such semiconductor purposes, the phosphorus must satisfy extremely exactly purity requirements. Contaminations of less than $10^{-6}\%$ already may impair the electronic properties of semiconducting phosphides to such an extent that they are virtually inapplicable.

However, the degree of purification attainable is not the only criterion for technological and economical suitability of a purifying process. It is also desirable that the operational mode of the purifying process be sufficiently simple for industrial application, and it is also advantageous that the purifying process affords the production of large quantities of electronically pure phosphorus material in a continuous process.

In these respects the known methods for extreme purification of phosphorus leave much to be desired, and it is an object of our invention to devise a process that reliably satisfies all of the abovementioned requirements and desiderata.

To this end, and in accordance with our invention, we subject the contaminated phosphorus to a limited or dosed oxidizing effect of an acid treatment with nitric acid of 10 to 50% concentration at a temperature of 45 to 100° C. and we distill the acid-treated phosphorus with steam subsequent to or simultaneously with the acid treatment.

When referring to a limited or dosed-oxidizing treatment of the acid, we wish it to be understood that the concentration of the nitric acid and the processing temperature are so rated or limited that only the impurities of the phosphorus become oxidized while the phosphorus itself is not subjected to appreciable oxidation.

The method can be performed either in two separate steps or in a single process that simultaneously combines both steps.

Figure 1:
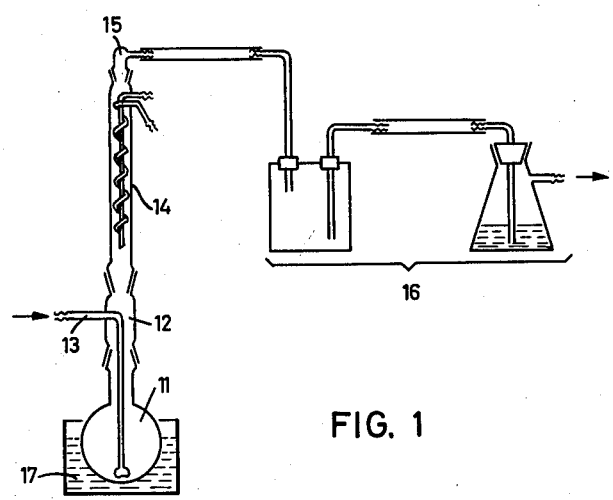
Figure 2:
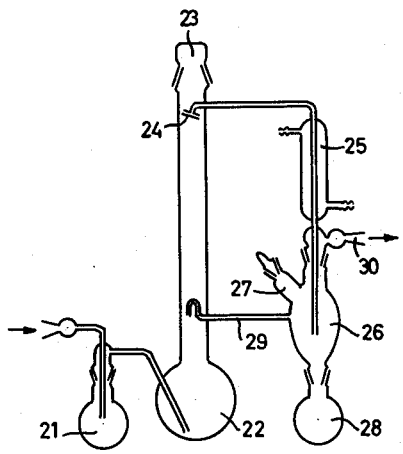

This will be more fully described in the following with reference to the accompanying drawing in which:

FIG. 1 shows schematically an apparatus for performing the purifying method of the invention in two separate steps; and FIG. 2 shows schematically an apparatus for performing the method in a single stage.

When performing the method in two steps, the first step relates to subjecting the phosphorus to a dosed oxidizing acid treatment, whereas the second step constitutes steam distillation. It has been discovered that such a combined application of controlled nitric acid oxidation followed by steam distillation is so extremely effective in eliminating the electronically detrimental contaminations as to be far superior to all other purifying methods employing other processing agents as combination components.

Of the two method steps, the dosed oxidizing treatment constitutes an essential feature of the invention. We have found that nitric acid having an $HNO_3$ content by weight of about 10 to 50% at a temperature of 45 to 100° C. can oxidize only negligible quantities of phosphorus but that on the other hand this acid at the stated temperature dissociates by oxidation the contaminations contained in the phosphorus, for example sulfur compounds and carbon compounds as well as a number of other admixtures, thus converting them into readily removable compounds. The processing of white phosphorus by subjecting it to such selective oxidation has been found to have an extremely effective purifying action.

EXAMPLE 1

The equipment shown in FIG. 1, comprising a quartz flask 11, a transition piece 12 with a lateral supply pipe 13, a cooler 14 with a coolant-circulation tube, a gas outlet 15, a safety sealing device 16 and a water bath 17, was used.

300 ml. of freshly distilled 60 to 65% nitric acid were diluted with the same volume of repeatedly distilled water. The solution was heated in the quartz flask 11 to about 60° C. 250 to 300 g. commercially available white phosphorus were melted under water in a second flask and, by means of an inert gas, such as nitrogen or argon, were forced into the flask 11 with the aid of a siphon. The free leg of the siphon was kept immersed in the nitric acid. Thereafter the equipment was put together, as shown in FIG. 1, and the flask 11 was kept in the water bath 17 at a temperature of 50° C. The gas supply pipe 13, which enters to the greatest feasible depth into the phosphorus melt and carries at its end a gas distribution device, was used for introducing inert gas so that the phosphorus was continuously whirled through and phosphorus droplets were flung upwardly within the acid. Vaporized water as well as phosphorus particles entrained by the gas flow were retained by the cooler 14. The safety device 16 prevents the ingress of air in the event of failure of the inert gas supply through pipe 13 or in the event the heating devices become faulty. The acid treatment was performed for a period of 120 hours. After each 24 hour period, the acid consumed was replenished. Due to the removal of impurities from the phosphorus, the acid clearly changed its appearance. After the first 24 hours, it has a deep dark brown color and contains a large number of dark particles.

The acid was replenished in the following manner. After the flask 11 was removed from the equipment, the phosphorus was cooled and thus solidified. The acid on top of the phosphorus layer was decanted off. Thereafter the flask was rinsed two or three times with repeatedly distilled water and thereafter again filled with acid. The consumed acid was replenished by fresh acid sufficiently frequently to have the last replenishment remain after 24 hours completely clear and colorless. In the present case, the acid was replenished four times.

The analysis of the above-mentioned particles which are partly soluble in the acid and cause it to be colored brown reveals that they contain 66.41% carbon among other constituents. The appearance of these particles can be explained by the oxidizing conversion into sludge-forming dissociation products of the carbon compounds contained in the white phosphorus.

The acid treatment also causes an acidic-oxidizing dissociation of any sulfur compounds present by converting the sulfur into $H_2SO_4$ which is not detrimental because it no longer reacts with the phosphorus.

In contrast thereto, non-oxidizing acids, for example HCl, or water, when acting upon phosphorus-sulfur compounds temporarily liberate sulfide ions which immediately react with phosphorus and again form phosphorus-sulfur compounds.

Aside from the above-mentioned impurities, the acid treatment also eliminates a number of contaminations. The various purifying effects are listed in the following.

(1) Metallic impurities: Cu, Fe, Zn, Al are dissolved.
(2) Phosphides dissociable by acid: Phosphorus compounds of sulfur, selenium, tellurium, zinc, cadmium, aluminum, copper, iron are dissociated and made harmless by oxidation.
(3) Compounds not dissociable by acid: $SiO_2$ is precipitated in form of a sludge.
(4) Carbon-containing compounds: Carbon compounds, particularly those that evaporate together with steam, are oxidized and the dissociation products are precipitated in form of sludge.

After the selective oxidizing acid treatment, the phosphorus is remarkably pure. However, the degree of purity is considerably increased by steam distillation subsequent to the acid treatment.

For this purpose, the phosphorus purified by acid treatment in accordance with the above-described Example 1, is subsequently subjected to steam distillation in an inert atmosphere. Nitrogen was used for this purpose. The steam was produced from repeatedly distilled water. All components of the equipment were treated with steam until the condensed water was found to be free of metal by testing it with dithizon. After putting the equipment together, the complete apparatus was again traversed by steam. The apparatus should, if possible, consist entirely of quartz.

The quantity of phosphorus to be entrained by the steam during distillation was preferably made so large that, even if the distillation requires a period of several days, the self-cleaning effect of the equipment during continuous operation is utilized. The phosphorus being entrained is caught in a condensing container filled with water and is redistilled. After removing the water, by heating in vacuum, the phosphorus can ultimately be converted to the red modification.

From technological and economical viewpoints, however, it is preferable to perform the purification in a single stage that comprises both method steps simultaneously. This improved process will be described presently with reference to FIG. 2.

EXAMPLE 2

Denoted in FIG. 2 by 21 is the phosphorus evaporator with a fused-on supply pipe. The equipment also comprises a long-neck flask 22 with a closure cap 23 and a fused-in drop catcher 24, a cooler 25, a condensing vessel 26 with a fused-in filling nipple 27, a phosphorus collector 28, and a water return pipe 29 with a level regulator. The inert gas entering through pipe 21 leaves the equipment at 30.

The flask 22 was supplied with 1.5 liters of 15% nitric acid, the condensing container 26, 28 was filled with water until a given liquid level, determined by the level regulator, was reached. Thereafter the evaporator 21, supplied with about 300 g. of white phosphorus and about 100 ml. water, was joined with the rest of the equipment. The equipment was then rinsed with nitrogen for 10 minutes with cap 23 open and outlet 30 closed. Thereafter the nitrogen rinsing was continued for about 20 minutes with cap 23 closed and outlet 30 open. During the rinsing period the acid was heated to boiling temperature, and the evaporator flask 21 was heated to 110° C. in an oil bath. The flow rate of nitrogen was about 100 liters per hour.

After vaporization of the water in flask 21, the nitrogen contains phosphorus vapor and flows through the boiling acid in flask 22 and a phosphorus tension of about 5 mm. Hg adjusted itself. Under these conditions no condensation of phosphorus took place in the flask 22. The phosphorus, together with the escaping steam, was driven from the acid (by the flow of nitrogen) through the cooler where it liquefied, and thence into the container 26. The temperature of the water in container 26 was kept above 50° C. in order to prevent solidification of the phosphorus particles and clogging of the equipment. The liquid phosphorus collected in the flask 28.

This method is advantageous since both a relatively short time is required for the purifying process and fine purification takes place since the phosphorus with its impurities is subjected to the purifying acid in vaporous form and hence in finest distribution.

The boiling 15% nitric acid does not attack the phosphorus vapor but converts the impurities by acidic oxidizing reaction into non-detrimental compounds.

Due to the vaporization of water the acid concentration would soon become so high as to cause oxidation of the phosphorus itself. This makes it necessary to keep the acid concentration substantially constant. For this purpose, the vaporized water is recycled back into the reactor 22 after condensation of the steam. This is effected by the water return pipe 29. The level regulator of the return pipe 29 has the effect of maintaining the water level in flask 26 at the same height and also prevents ingress of nitrogen, hydrogen and phosphorus vapor from flask 22. The entire purifying process is preferably repeated.

According to a modified mode of processing, the vaporized water of the acid is replenished with the aid of a large vessel (not shown in FIG. 2). The rate of water supply must then be carefully adapted to the rate of vaporization so that the acid concentration does not change in order to secure the desired purifying effect while the phosphorus vapor itself is not oxidized.

The first distillation can also be performed with red phosphorus. In this case the vaporizer flask 21 is to be kept at a temperature of about 250° C. The red phosphorus need not be covered with water.

No impurities can be ascertained by usual chemical methods in phosphorus purified by the method according to the invention. A suitable measure of purity is given by employing the purified phosphorus for the production of indium phosphide and then determining the electrical properties of the phosphide. Used for this purpose in most cases is a measurement of the specific electric conductance $\sigma$, the Hall coefficient $R_H$, and the carrier mobility $\mu$ of the electric charge carriers. Small values of electric conductance $\sigma$ with simultaneously high values of the Hall coefficient $R_H$ and mobility values $\mu$ of the charge carriers above 4000 are indicative of extremely high purity of the component substances used for the indium phosphide. If for the component indium a material of high uniform purity is used and for the component phosphorus a material of variable purity degree, then the measuring values obtained with the semiconductor indium phosphide afford comparative conclusions as to the purity of the kinds of phosphorus employed.

For illustration, the following table indicates the measuring values obtained with three monocrystalline rods of indium phosphide. Used for the indium components in each case was extremely pure indium of the same charge and hence the same purity degree. The following respective kinds of phosphorus were used for the phosphorus components.

Phosphorus I: Commercially available "ultra-pure phosphorus for semiconductor purposes 99.9999+%."
Phosphorus II: Commercially available "ultra-pure phosphorus for semiconductor purposes at least 99.999+%."
Phosphorus III: Phosphorus purified according to the method of the invention.

*Table*

| Phosphorus | Indium phosphide | | |
|---|---|---|---|
| | spec. conductance ($\Omega^{-1}cm.^{-1}$) | Hall coefficient $R_H$(cm.$^3$A$^{-1}$s.$^{-1}$) | mobility (cm.$^2$V$^{-1}$sec.$^{-1}$) |
| I | 64 | 54 | 3,500 |
| II | 22 | 180 | 4,000 |
| III | 4 | 1,150 | 4,600 |

The superiority with respect to extreme purity of the phosphorus purified according to the invention is well manifested by the data in the last horizontal row indicating a remarkable reduction in specific electric conductane (at room temperature) accompanied by a greatly increased Hall coefficient as well as by an increase in carrier mobility.

We claim:
1. The method of removing electronically injurious impurities from phosphorus, which comprises subjecting phosphorus to impurity-oxidizing acidic treatment with nitric acid of 10 to 50% concentration at a temperature of 45 to 100° C., and distilling the acid-treated phosphorus with steam.
2. The method of claim 1, wherein the phosphorus is distilled subsequent to the acidic treatment.
3. The method of claim 1, wherein the phosphorus is distilled simultaneously with performing the acidic treatment.
4. The method of purifying phosphorus from electronically injurious contaminations, which comprises subjecting the phosphorus to contamination-oxidizing treatment with freshly distilled nitric acid of approximately 30% concentration for a duration of at least two days, and distilling the acid-treated phosphorus with steam.
5. The method of purifying phosphorus from electronically injurious contaminations, which comprises subjecting the phosphorus to contamination-oxidizing treatment by passing it in vaporous form through boiling nitric acid of about 15% concetration whereby the steam evolving from the boiling acid, passing the phosphorus-laden steam to a cooling location to segregate the purified phosphorus in solid form.
6. In the method of claim 5, the step of maintaining the concentration of the boiling nitric acid constant at about 15%.
7. In the method of claim 6, the step of replenishing the water vaporizing from the boiling acid by water from a storage vessel.
8. The method of purifying phosphorus from electronically injurious contaminations, which comprises subjecting the phosphorus to contamination-oxidizing treatment in a reaction vessel by passing the phosphorus in vaporous form through boiling nitric acid of about 15% concentration contained in said reaction vessel whereby acid-treated phosphorus vapor is entrained by the steam evolving from the boiling acid, passing the phosphorus-laden steam to a cooling location to segregate the purified phosphorus in solid form, condensing the steam and recycling the resulting water back to the reaction vessel.

References Cited in the file of this patent
UNITED STATES PATENTS

| 1,984,674 | Fiske et al. | Dec. 18, 1934 |
| 3,004,834 | Harnisch et al. | Oct. 17, 1961 |

FOREIGN PATENTS

| 1,045,994 | Germany | Aug. 3, 1957 |
| 812,701 | Great Britain | Apr. 29, 1959 |

OTHER REFERENCES

May 1953, Nucleonics, pp. 26, 27.